(12) United States Patent
Konopka

(10) Patent No.: US 7,042,161 B1
(45) Date of Patent: May 9, 2006

(54) BALLAST WITH ARC PROTECTION CIRCUIT

(75) Inventor: John G. Konopka, Deer Park, IL (US)

(73) Assignee: Osram Sylvania, Inc., Danvers, MA (US)

( * ) Notice: Subject to any disclaimer, the term of this patent is extended or adjusted under 35 U.S.C. 154(b) by 0 days.

(21) Appl. No.: 11/068,202

(22) Filed: Feb. 28, 2005

(51) Int. Cl.
*H05B 37/00* (2006.01)

(52) U.S. Cl. ............ 315/119; 315/225; 315/290; 315/209 R; 315/244; 315/DIG. 5; 363/56.03; 363/56.12; 361/93.6

(58) Field of Classification Search ........ 315/224, 315/225, 136, 119, 244, 247, 209 R, 290, 315/200 R, 208, 276, 287, DIG. 5, DIG. 7; 361/93.6, 94, 100; 363/56.01, 56.03, 56.05, 363/56.12, 124
See application file for complete search history.

(56) References Cited

U.S. PATENT DOCUMENTS

| | | | | |
|---|---|---|---|---|
| 4,488,199 A | 12/1984 | Bloomer | .................. | 361/93 |
| 5,619,105 A | 4/1997 | Holmquest | .................. | 315/225 |
| 5,751,115 A | 5/1998 | Jayaraman et al. | ......... | 315/225 |
| 5,751,120 A * | 5/1998 | Zeitler et al. | .............. | 315/307 |
| 5,770,925 A | 6/1998 | Konopka et al. | .......... | 315/225 |
| 5,872,429 A | 2/1999 | Xia et al. | ................... | 315/194 |
| 5,883,473 A | 3/1999 | Li et al. | ...................... | 315/225 |
| 5,945,788 A | 8/1999 | Li et al. | ...................... | 315/308 |
| 6,037,722 A | 3/2000 | Moisin | ....................... | 315/307 |
| 6,222,322 B1 * | 4/2001 | Stack | ......................... | 315/119 |
| 6,292,339 B1 * | 9/2001 | Brooks | ....................... | 361/78 |
| 6,400,095 B1 | 6/2002 | Primisser et al. | .......... | 315/224 |
| 6,720,739 B1 | 4/2004 | Konopka | .................... | 315/225 |
| 6,809,483 B1 * | 10/2004 | Alexandrov | ................ | 315/224 |
| 2002/0113559 A1 * | 8/2002 | Lam | .......................... | 315/224 |
| 2005/0046357 A1 | 3/2005 | Stack | ......................... | 315/119 |

* cited by examiner

Primary Examiner—Haissa Philogene
(74) Attorney, Agent, or Firm—Kenneth D. Labudda

(57) ABSTRACT

FA ballast (20) for powering a gas discharge lamp (70) comprises an inverter (200) and an arc protection circuit (600). Arc protection circuit (600) monitors an electrical signal within the ballast. In response to occurrence of a disturbance in the signal, such as what occurs during output arcing, arc protection circuit (600) disables the inverter (200) for a timed shutdown period. Arc protection circuit (600) provides a timed starting period for igniting the lamp, during which time any disturbance in the electrical signal is essentially ignored and inverter (200) is allowed to continue to operate. Arc protection circuit (600) also provides a restart function for periodically attempting to ignite and operate the lamp. Arc protection circuit (600) is preferably realized using a timer integrated circuit (U1) with associated discrete circuitry, and may be adapted for use with ballasts having self-oscillating or driven type inverters.

24 Claims, 7 Drawing Sheets

BALLAST WITH ARC PROTECTION CIRCUIT

FIELD OF THE INVENTION

The present invention relates to the general subject of circuits for powering discharge lamps. More particularly, the present invention relates to a ballast that includes an arc protection circuit.

RELATED APPLICATIONS

The subject matter of the present application is related to U.S. Pat. No. 6,720,739 B2 (titled "Ballast with Protection Circuit for Quickly Responding to Electrical Disturbances," issued on Apr. 13, 2004, and assigned to the same assignee as the present invention), the disclosure of which is incorporated herein by reference.

BACKGROUND OF THE INVENTION

Ballasts for gas discharge lamps provide high ignition voltages for starting the lamps. The ignition voltages supplied by preheat type ballasts are typically on the order of several hundred volts (e.g., 500 volts peak), while those provided by instant-start type ballasts may exceed 1000 volts peak. As a consequence of these high ignition voltages, ballasts are subject to the problem of output arcing.

Output arcing may occur in any of a number of different ways. For example, in fluorescent lighting installations, it is a common practice to replace failed lamps while AC power is applied to the ballast. This practice is referred to as "live" relamping. During live relamping, as a lamp is being removed or inserted, a momentary arc may form between the fixture socket contacts and a pin of the lamp. As another example, a sustained arc (as opposed to a momentary arc) arc may occur due to poor connections in the output wiring or the lamp sockets, or if a lamp is improperly installed in such a way that a small gap exists between the lamp pins and the contacts within the fixture sockets. If a connection to the lamp(s) is compromised due to a defective lamp socket or defective wiring, a high intensity, high temperature arc may be produced across the air gap caused by these faulty conditions.

Arcing is generally acknowledged to cause degradation of the contacts in the fixture sockets and undue stress on components within the ballast. Sustained arcing is especially undesirable because of its tendency to produce potentially destructive heating. In order to minimize any ill effects due to arcing, it is important that the arc be promptly extinguished. This requires a ballast that is capable of quickly detecting an arc and, subsequently, taking appropriate action to quickly extinguish the arc.

It also important that arc detection be inhibited during certain periods, such as inverter startup and lamp ignition. For instance, the normal starting process of the lamp is generally accompanied by the same types of electrical disturbances that occur during output arcing. Thus, unless arc detection is inhibited during lamp starting, the ballast may be prevented from properly igniting the lamp. Additionally, although most lamps are capable, under ideal conditions, of igniting and operating normally within a short period of time (e.g., 20 milliseconds), some lamps, due to age or low temperature, require a much longer time to ignite and stabilize. Thus, arc detection should be inhibited for a period that is long enough (e.g., 200 milliseconds) to accommodate lamp starting under conditions that are less than ideal.

It is also desirable that a ballast possess some type of automatic restart capability wherein, within a specified time following detection of an arc and shutdown of the ballast, periodic attempts are made to restart the ballast and ignite the lamp. This feature is desirable in order to prevent a "latched" shutdown of the ballast (which necessitates that power to the ballast be turned off and then on again in order to reset the ballast) in the event of false detection due to a momentary power line transient or any of a number of anomalous phenomena that pose no real threat to ballast reliability or safety. Also, because lamps are somewhat unpredictable, it is possible that an otherwise "good" lamp may sometimes fail to properly start on the first attempt. In such a case, a ballast with automatic restart capability will periodically attempt to start the lamp, rather than simply latching the ballast in a shutdown state until the power to the ballast is cycled. As long as a condition that causes arcing is present, the ballast may cause the lamp to periodically flash (e.g., the lamp will light for up to 200 milliseconds every 2 seconds), thereby provide a useful visual indication that the fixture and/or lamp requires servicing.

Thus, a need exists for a ballast having an arc protection circuit that quickly detects an output arc and that then takes appropriate action to quickly extinguish the arc. A need also exists for a ballast having an arc protection circuit that provides an inhibit period in order to allow for proper lamp starting. A further need exists for a ballast having an arc protection circuit that provides automatic restart capability in order to accommodate false detection and anomalous starting failure of a "good" lamp, as well as to provide a useful visual indication of a need for servicing the lamp(s) and/or fixture. A further need exists for a ballast having an protection circuit that is economical and readily implemented within existing ballasts. Such a ballast and arc protection circuit would represent a considerable advance over the prior art.

DETAILED DESCRIPTION OF THE PREFERRED EMBODIMENTS

Figure 1:
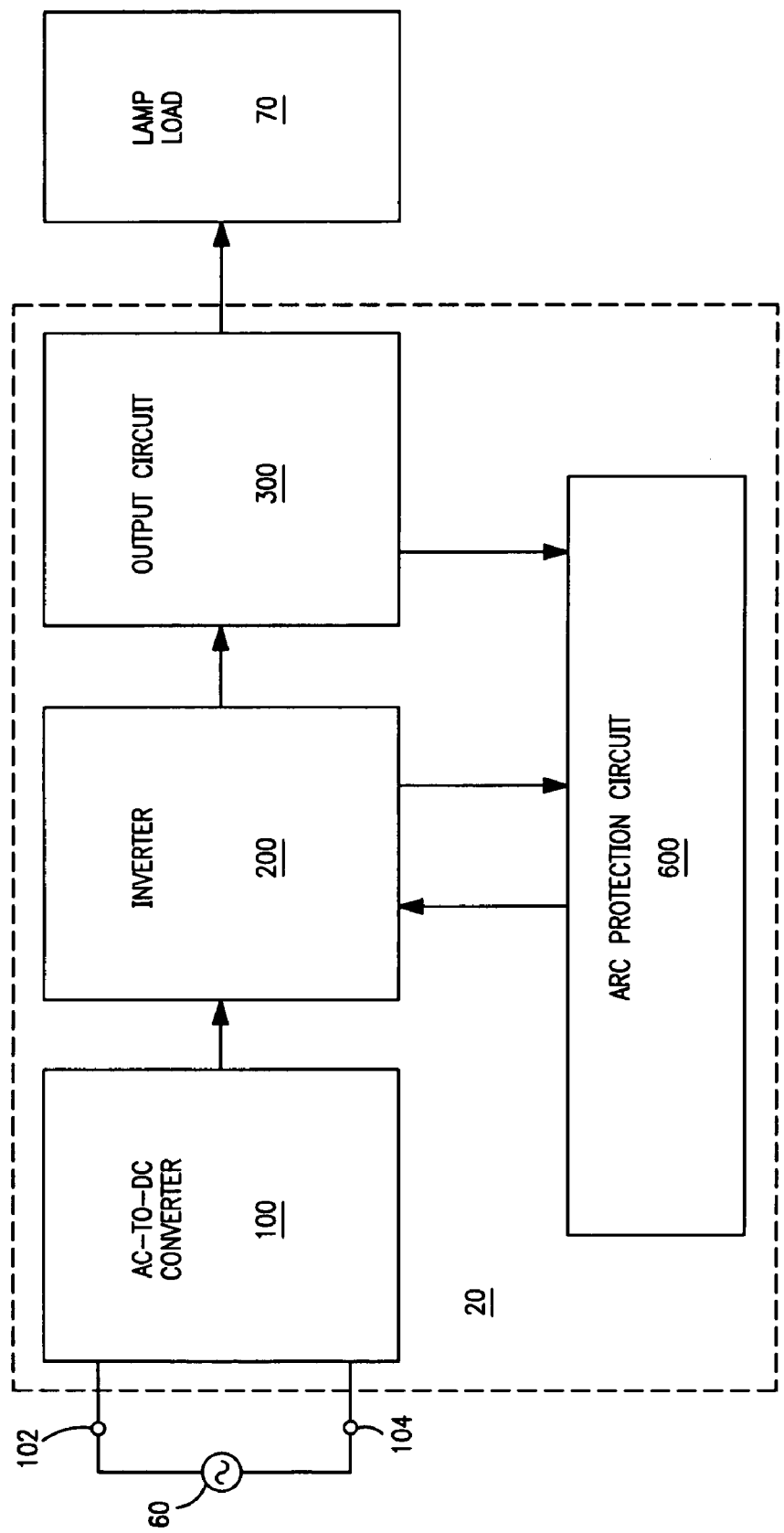
FIG. 1 is a block electrical diagram of a ballast with an arc protection circuit, in accordance with the preferred embodiments of the present invention.

Referring to FIG. 1, a ballast 20 for powering a lamp load 70 that includes at least one gas discharge lamp comprises an AC-to-DC converter 100, an inverter 200, an output circuit 300, and an arc protection circuit 600. AC-to-DC converter 100 has an input 102,104 for receiving an AC supply voltage 60, and is operable to provide a DC rail voltage to inverter 200. Output circuit 300 is coupled to inverter 200, and is adapted for coupling to lamp load 70. Arc protection circuit 600 is coupled to inverter 200; optionally, arc protection circuit 600 is also coupled to output circuit 300.

During operation, arc protection circuit 600 monitors an electrical signal within either inverter 200 or output circuit 300 for a disturbance; a disturbance is deemed to have occurred when at least a portion of the electrical signal exhibits a time-rate-of-change that exceeds a predetermined threshold value. Arc protection circuit 600 provides a timed starting period during which inverter 200 is enabled and allowed to attempt to start the lamp, regardless of any disturbance in the electrical signal. After completion of the timed starting period, if a disturbance occurs in the electrical signal, arc protection circuit 600 disables inverter 200 and keeps the inverter disabled for a timed shutdown period. After completion of the timed shutdown period, arc protection circuit 600 again provides the timed starting period (i.e., inverter 200 is re-enabled and allowed to attempt to start the lamp, independent of any disturbance in the electrical signal).

Figure 2:
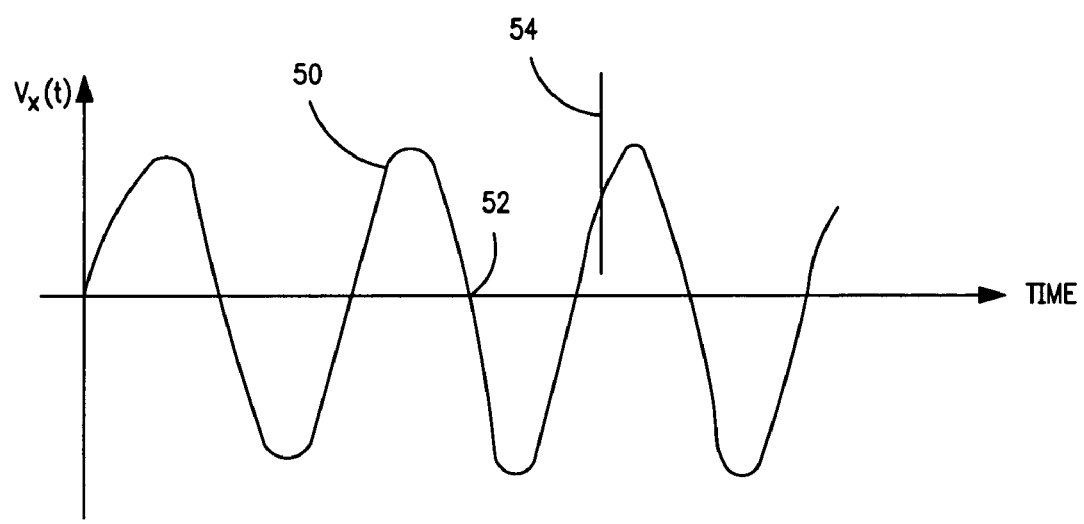
FIG. 2 describes an example of an electrical disturbance to which the disclosed arc protection circuit is responsive, in accordance with the preferred embodiments of the present invention.

Typical disturbances to which arc protection circuit 600 is responsive include: (i) occurrence of an arcing condition at an output of the ballast; and (ii) disconnection of a lamp from the ballast. As illustrated in FIG. 2, such disturbances generally cause at least one transient spike 54 having a relatively large time-rate-of-change to appear in the monitored electrical signal 50. It should of course be appreciated that the waveform in FIG. 2 is a gross simplification of what occurs in reality; most disturbances, such as output arcing, will cause multiple transient spikes to appear in the monitored signal 50. When ballast 20 and lamp load 70 are operating in a normal manner, the electrical signal will be a periodic signal having a period. For example, as illustrated in FIG. 2, the signal 50 may be substantially sinusoidal. During normal operation of ballast 20 and lamp load 70, the maximum time-rate-of-change of a sinusoidal signal occurs at the zero crossings 52 of signal 50, and is substantially less than the maximum time-rate-of-change of transient 54.

Advantageously, when a disturbance occurs in the electrical signal after completion of the timed starting period, arc protection circuit 600 is capable of disabling inverter 200 within a response time that is less than twice the period of the electrical signal. For typical ballast applications, wherein the operating frequency of the inverter is designed to be 20 kilohertz or greater (corresponding to be a period of 50 microseconds or less), arc protection circuit 600 is thus capable of disabling inverter 200 within a response time that is less than 100 microseconds.

Preferably, the timed starting period is chosen to be on the order of about 200 milliseconds, which should provide sufficient time to allow the lamp(s) to ignite and stabilize, even under conditions involving aged lamps or low ambient temperatures.

Preferably, the timed shutdown period is chosen to be on the order of about 2 seconds. Stated another way, it is preferred that the timed shutdown period be at least about 10 times greater than the timed starting period. Consequently, in the event of a recurring disturbance such as output arcing, inverter 200 will have a duty cycle that is sufficiently low (e.g., 10% or so) to prevent the arc from causing potentially damaging heat to build up within the ballast and/or the lamp sockets of the lighting fixture. Additionally, a timed starting period on the order of about 200 milliseconds is suitable for providing a useful visual indication (i.e., the lamp(s), if functional, will flash briefly but perceptibly once every 2 seconds) that an arc has been detected and that the fixture and/or lamp(s) require servicing and/or replacement.

Figure 3:
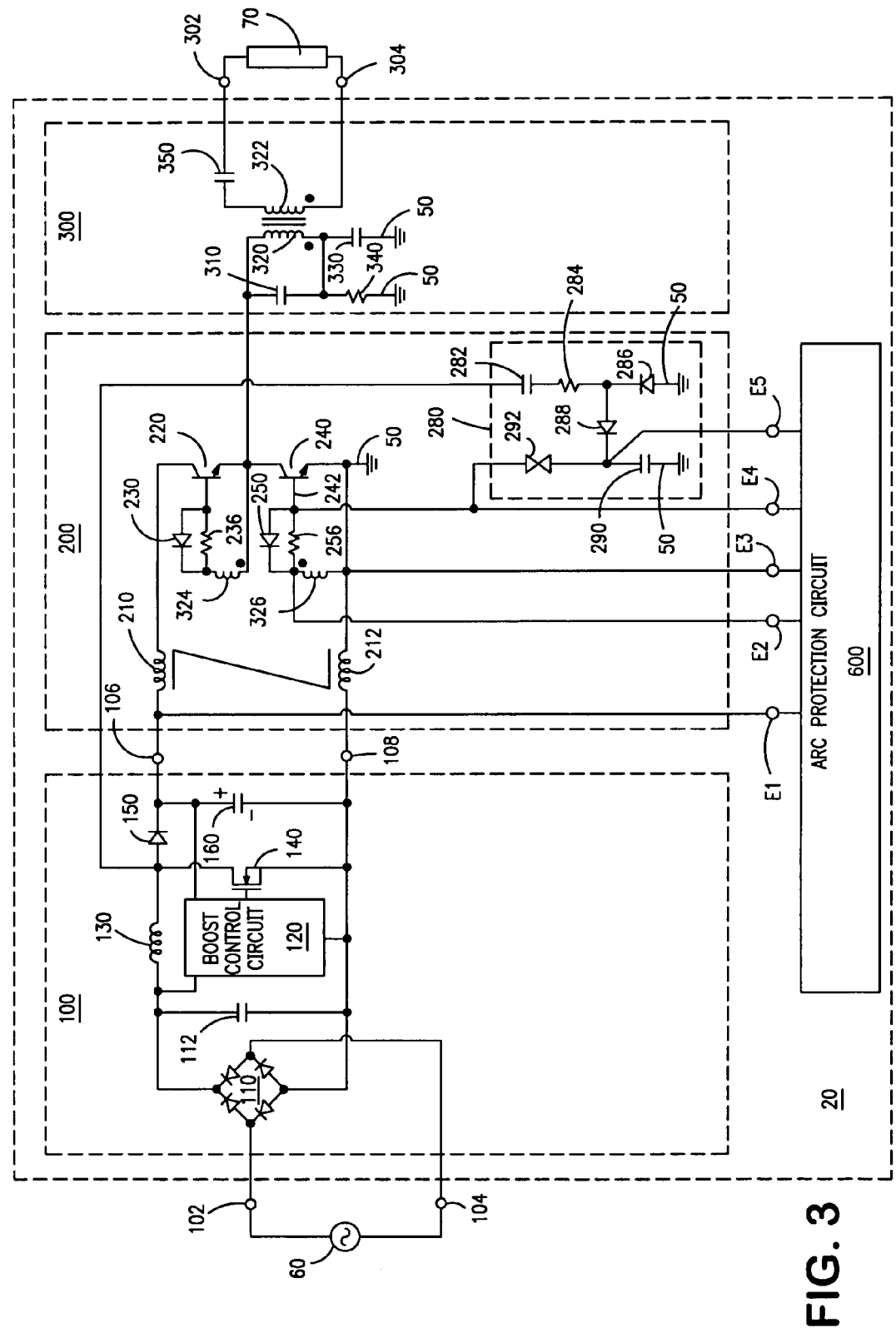
FIG. 3 is a partial block diagram schematic of a ballast with an arc protection circuit and a self-oscillating type inverter, in accordance with a first preferred embodiment of the present invention.

Turning now to FIG. 3, in a first preferred embodiment of the present invention, AC-to-DC converter 100 is implemented as a combination of a full-wave rectifier circuit 110 and a boost converter 120,130,140,150,160, inverter 200 is implemented as a current-fed self-oscillating half-bridge type inverter, and output circuit 300 is implemented as a parallel resonant output circuit. Because most of the details concerning the structure and operation of AC-to-DC converter 100, inverter 200, and output circuit 300 are well known to those skilled in the ballast art, a detailed description of those circuits is not presented herein.

As described in FIG. 3, AC-to-DC converter 100 comprises input terminals 102,104, a full-wave diode bridge 110, a capacitor 112, a boost control circuit 120, a boost inductor 130, a boost transistor 140, a boost rectifier 150, a bulk capacitor 160, and output terminals 106,108. During operation, AC-to-DC converter receives (via input terminals 102, 104) an AC supply voltage from AC source 60 and provides (via output terminals 106,108) a DC rail voltage (e.g., 455 volts) to inverter 200.

Inverter 200 comprises dual current-feed inductors 210, 212, first and second inverter transistors 220,240, a first base drive circuit 230,236,324, a second base drive circuit 250, 256,326, and an inverter startup circuit 280. The first base drive circuit is coupled to first inverter transistor 220, and comprises a base drive winding 324, a diode 230, and a resistor 236. Second base drive circuit is coupled to second inverter transistor, and comprises a base drive winding 326, a diode 250, and a resistor 256. Inverter startup circuit 280 is coupled to AC-to-DC converter 100, second inverter transistor 240, and a circuit ground 50, and comprises a capacitor 282, a resistor 284, a first diode 286, a second diode 288, a startup capacitor 290, and a diac 292. During operation, inverter 200 receives the DC rail voltage from AC-to-DC converter 100 and provides (via complementary switching of inverter transistors 220,240) a high frequency (e.g., greater than 20,000 hertz) alternating voltage to output circuit 300.

Output circuit 300 comprises output connections 302,304, a resonant capacitor 310, an output transformer 320,322, 324,326, a DC blocking capacitor 330, a resistor 340, and a ballasting capacitor 350. Output transformer 320,322,324, 326 includes a primary winding 320 coupled to inverter 200, a secondary winding 322 coupled to output connections 302,304, a first auxiliary winding 324 that is part of the first base drive circuit within inverter 200, and a second auxiliary winding 326 that is part of the second base drive circuit within inverter 200. During operation, output circuit 300 receives the high frequency alternating voltage provided by inverter 200 and supplies (via output connections 302,304) a high voltage for igniting, and a magnitude-limited current for operating, lamp 70.

As described in FIG. 3, arc protection circuit 600 comprises a DC supply input E1, a signal monitoring input E2, a circuit ground input E3, an inverter disable output E4, and an inverter startup inhibit output E5. DC supply input E1 is coupled to output connection 106 of AC-to-DC converter 100. Signal monitoring input E2 is coupled to second base drive circuit 250,256,326; more particularly, input E2 is coupled to second auxiliary winding 326. Circuit ground input E3 is coupled to circuit ground 50. Inverter disable output E4 is coupled to second inverter transistor 240; more particularly, output E4 is coupled to a base 242 of second inverter transistor 240. Finally, inverter startup inhibit output E5 is coupled to inverter startup circuit 280; more particularly, output E5 is coupled to a junction of startup capacitor 290 and diac 292 within inverter startup circuit 280.

In the first preferred embodiment, as described in FIG. 3, the voltage across second auxiliary winding 326 serves as the electrical signal that is monitored by arc protection circuit 600. Because second auxiliary winding 326 is magnetically coupled to primary winding 320 and secondary winding 322 within output circuit 300, any disturbance (e.g., an arcing condition) that occurs at output connections 302, 304 will induce a fast rise-time signal in the voltage across second auxiliary winding 326. That fast rise-time signal will be detected by arc protection circuit 600 via signal monitoring input E2.

During the timed starting period (e.g., the first 200 milliseconds after inverter 200 or arc protection circuit 600 begins to operate), inverter 200 is enabled and allowed to attempt to start lamp 70, regardless of whether or not a fast rise-time signal (indicative of a disturbance) is present in the voltage across winding 326. After completion of the timed starting period, if a disturbance is detected in the voltage across winding 326, arc protection circuit 600 responds by effectively shunting inverter disable output E4 and inverter startup inhibit output E5 to circuit ground 50 for the duration of the timed shutdown period (e.g., 2 seconds). With inverter disable output E4 effectively shunted to ground, the base 242 of inverter transistor 240 is likewise effectively shunted to ground, causing a cessation of inverter switching and thereby disabling inverter 200; as will be explained in further detail herein, for a ballast with a self-oscillating type inverter, it is actually preferred that output E4 be shunted to a level (e.g., −1 volt) that is somewhat less than circuit ground in order to safely ensure that inverter switching is terminated. At the same time, with inverter startup inhibit output E5 shunted to ground, startup capacitor 290 is prevented from charging up, thereby keeping diac 292 off and preventing inverter startup circuit 280 from attempting to provide a startup pulse to inverter transistor 240.

Upon completion of the timed shutdown period (e.g., after the inverter has been disabled for 2 seconds), arc protection circuit 600 ceases to shunt inverter disable output E4 and inverter startup inhibit output E5 to circuit ground 50, thereby re-enabling inverter 200 and allowing inverter 200 to continue to operate for at least the duration of the timed starting period (e.g., 200 milliseconds), during which time inverter 200 and output circuit 300 are again allowed to attempt to ignite and operate lamp 70. After completion of the timed starting period, if no arcing is detected, arc protection circuit 600 allows inverter 200 to continue to operate in a normal manner. Conversely, if arcing is detected after completion of the timed starting period, arc protection circuit 600 will again disable inverter 200 and keep inverter 200 disabled for the duration of the timed shutdown period (e.g., 2 seconds).

Figure 4:
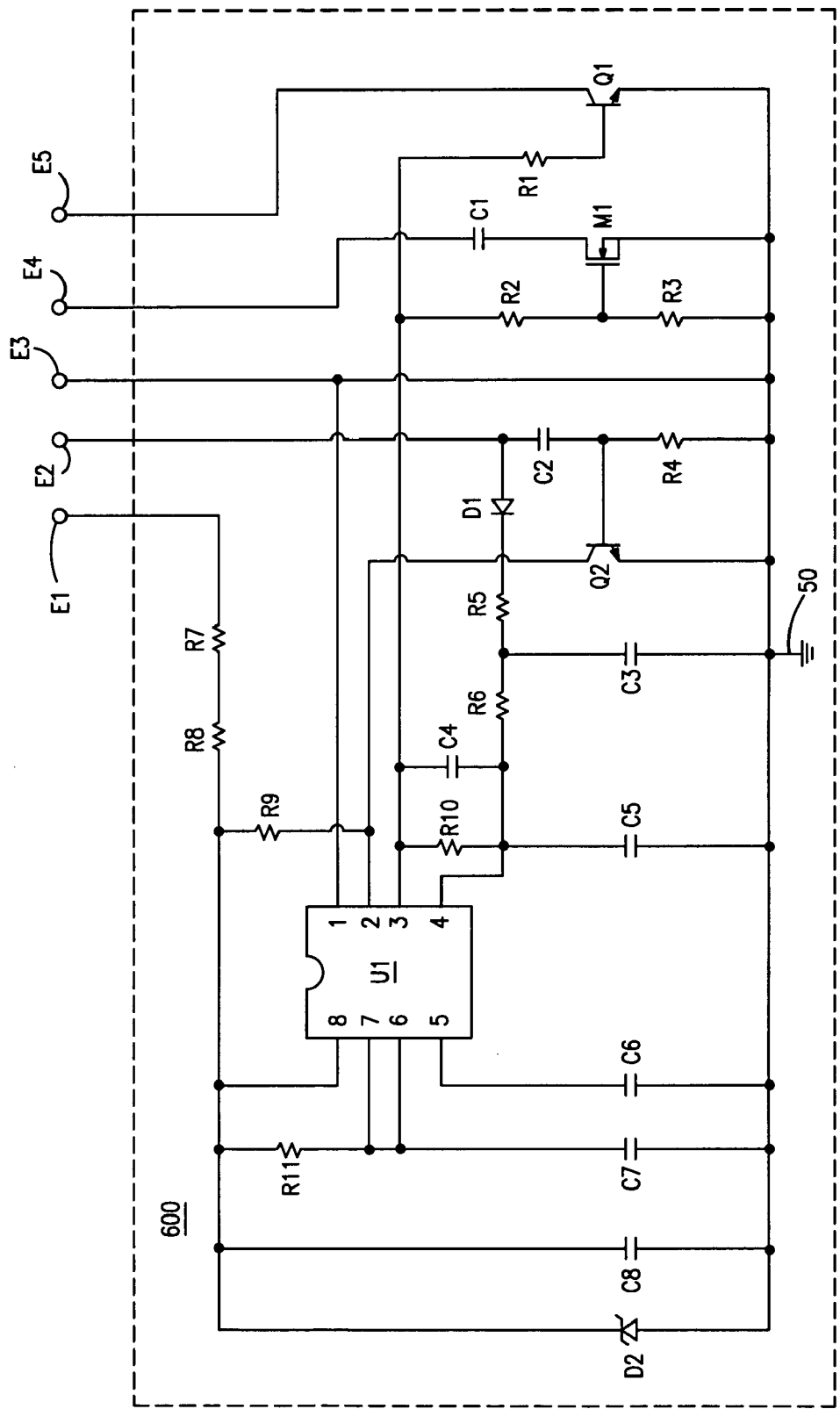
FIG. 4 is a detailed schematic diagram of an arc protection circuit that is suitable for use in the ballast of FIG. 3, in accordance with the first preferred embodiment of the present invention.

Referring now to FIG. 4, in a first preferred embodiment of the present invention, arc protection circuit 600 further comprises a timer integrated circuit (IC) U1, a detector circuit C2,R4,Q2, a first shunting circuit C1,M1,R2,R3, and a second shunting circuit Q1,R1. Timer U1 comprises a plurality of pins 1,2,3,4,5,6,7,8, and is preferably realized by a 555 type timer integrated circuit (e.g., part number TLC551, manufactured by Texas Instruments); a CMOS version is preferred in order to minimize operating power requirements and dissipation in the components (i.e., resistors R7, R8) via which operating power is delivered to timer U1. Detector circuit C2,R4,Q2 is coupled to signal monitoring input E2, a second pin 2 of timer U1, and circuit ground 50. First shunting circuit C1,M1,R2,R3 is coupled to inverter disable output E4, a third pin 3 of timer U1, and circuit ground 50. Second shunting circuit Q1,R1 is coupled to inverter startup inhibit output E5, the third pin 3 of timer U1, and circuit ground 50.

Preferred component values for realizing arc protection circuit 600 are listed as follows:

Resistor R1: 100,000 ohms
Resistors R2, R3: 100,000 ohms
Resistors R4, R5: 470 ohms
Resistor R6: 470,000 ohms
Resistors R7, R8: 300,000 ohms
Resistor R9: 10,000 ohms
Resistors R10, R11: 220,000 ohms
Capacitors C1, C3: 0.1 microfarads
Capacitor C2: 220 picofarads
Capacitor C4: 2.2 microfarads
Capacitor C5: 470 picofarads
Capacitor C6: 0.01 microfarads
Capacitor C7: 10 microfarads
Capacitor C8: 4.7 microfarads
Diode D1: 1N4148
Diode D2: 10 volt Zener (e.g., ON Semiconductor part no. 1N4697)
Transistors Q1, Q2: 2N3904
Transistor M1: 2N7000
Integrated circuit U1: 555 type timer, CMOS version (e.g., Texas Instruments part no. TLC551)

The detailed operation of ballast 20 and arc protection circuit 600 is now described with reference to FIGS. 3 and 4 as follows. In the following description, unless otherwise noted, all voltages are referenced with respect to circuit ground 50.

Within a short period of time after AC power is applied to ballast 20, boost control circuit 120 turns on and starts to provide switching of boost transistor 120. Subsequently, within inverter startup circuit 280, capacitor 290 begins to charge up via capacitor 282, resistor 284, and diode 288. Once the voltage across capacitor 290 reaches a predetermined level (e.g., 32 volts), diac 292 becomes conductive and delivers a starting pulse (from the energy stored in capacitor 290) to the base 242 of inverter transistor 240. The starting pulse causes inverter transistor 240 to turn on, thereby initiating self-oscillating operation of inverter 200, in a manner that is well known to those skilled in the art.

Arc protection circuit 600 begins to operate within a short period of time following application of AC power to the ballast. More particularly, after power is applied to ballast 20, the output voltage that is present between outputs 106,108 of AC-to-DC converter 100 rapidly reaches the peak value (e.g., 390 volts) of the AC line source voltage (e.g., 277 volts rms), and then increases to an even higher value (e.g., 455 volts) after the boost converter begins to operate. Within arc protection circuit 600, operating power for timer IC U is derived from the output of AC-to-DC converter 100, and is delivered to pin 8 of timer IC U1 via DC supply input E1, resistors R7 and R8, and capacitor C8. Zener diode D2 is selected so that approximately 10 volts DC is provided to pin 8 of timer IC U101 when the output voltage of AC-to-DC converter 100 is at 455 volts DC.

During normal ignition of lamp 70, as the lamp strikes, signals similar to those that occur during a disturbance (e.g., output arcing) may ordinarily occur in inverter 200 and output circuit 300. As previously alluded to, it is important that such signals be essentially disregarded by arc protection 600 in order to allow inverter 200 and output circuit 300 to operate long enough in order to successfully ignite lamp 70. Accordingly, arc protection circuit 600 is designed to ignore any disturbances that occur during the initial period (hereinafter referred to as the timed starting period—e.g., 200 milliseconds) following activation of timer IC U1. The timed starting period is provided by ensuring that the voltage across capacitor C4, and correspondingly the voltage at pin 4 (reset control pin) of integrated circuit U1, remains below 1 volt for about 200 milliseconds after inverter 200 begins to operate. During the timed starting period, the output (pin 3) of timer IC U1 will not be triggered (which would prematurely disable the inverter), even if transistor Q2 is turned on by occurrence of a perceived disturbance in the voltage across winding 326.

When inverter 200 starts, 15 volts peak-to-peak appears at the junction of capacitor C2 and diode D1. During the positive half-cycles of this voltage, D1 conducts and capacitor C3 is charged through current-limiting resistor R5. The result of this charging is that capacitor C3 will have a voltage of about 6 volts (DC) across it. At this time, pin 3 of U1 is held at zero volts (by its internal logic). The voltage across timing capacitor C4, which was at zero volts prior to inverter startup, starts increasing (via resistor R6) due to the voltage across capacitor C3, and reaches about 1 volt after about 200 milliseconds. Until that happens, the voltage at pin 3 of IC U1 remains low, thereby allowing inverter 200 to continue to operate in order to ignite and start lamp 70, regardless of any disturbance that may appear in the voltage across second auxiliary winding 326.

At the completion of the timed starting period (e.g., t=200 milliseconds), the voltage across C4 reaches 1 volt, thereby allowing timer U1 to trigger and disable inverter 200 if a disturbance is detected via signal monitoring input E2.

During normal operation of ballast 20 and lamp 70, the voltage across second auxiliary winding 326 is a high frequency (e.g., 45 kilohertz) signal having a peak-to-peak amplitude of about 15 volts. Within arc protection circuit 600, capacitor C2 and resistor R4 function as a high-pass filter. During normal operation, when the voltage across second auxiliary winding 326 is devoid of any fast rise-time transients indicative of a disturbance, the voltage across resistor R4 remains substantially below the required turn-on voltage of transistor Q2; accordingly, in the absence of any disturbance, transistor Q2 remains off.

In the event of a disturbance, a fast rise-time signal will appear in the voltage across second auxiliary winding 326, and will be detected by arc protection circuit 600 via signal monitoring input E2. In response to a fast-rise time signal at input E2, the reactance of capacitor C2 (which is inversely proportional to frequency) will decrease and the voltage that develops across resistor R4 will be sufficiently high to turn transistor Q2 on. With transistor Q2 on, collector current will flow through transistor Q2 and produce a voltage drop across resistor R9. When the voltage drop across resistor R9 exceeds two-thirds (e.g., 6.7 volts) of the timer supply voltage (e.g., 10 volts), timer U1 will be triggered and a single timing pulse will be generated within IC U1, causing the voltage at the output of pin 3 to go high (e.g., 10 volts) for a predetermined duration; the duration of the timing pulse is determined by the values of resistor R11 and capacitor C7, and is preferably set at about 2 seconds (i.e., the timed shutdown period). Resistors R2 and R3 are selected so that, when the output of pin 3 goes high (e.g., 10 volts), about 5 volts will be applied to the gate of transistor M1, causing transistor M1 to turn on. With transistor M1 on, inverter disable output E4 and base 242 of second inverter transistor 240 are pulled down to a level of about −1 volt (during normal operation, capacitor C1 is peak charged, via winding 326 and a body diode internal to transistor M1, to a level of about −6.5 volts), thereby forcing second inverter transistor 240 to be off, which effectively disables inverter 200. The negative stored voltage (e.g., −6.5 volts) across capacitor C1 ensures that inverter switching is promptly terminated once transistor M1 turns on. In this way, arc protection circuit 600 quickly disables inverter 200 after occurrence of a disturbance.

At about the same time as transistor M1 turns on and disables the inverter, transistor Q1 also turns on (due to the positive voltage present at pin 3 of timer IC U1) and shunts inverter startup inhibit output E5 and starting capacitor 290 to circuit ground 50. This prevents capacitor 290 from charging, thereby preventing inverter startup circuit 280 from attempting to restart the inverter. Transistor Q1 remains on as long as the output of pin 3 remains high. In this way, inverter 200 remains disabled for the duration (e.g., 2 seconds) of the one-shot timing cycle (i.e., the shutdown period) provided by timer integrated circuit U1.

During the one-shot timing cycle (which is executed upon detection of a disturbance), pin 3 of IC U1 goes high, thereby forcing pin 4 to go high, and causing capacitor C4 to discharge through resistor R10. Before completion of the one-shot timing cycle, capacitor C4 completely discharges through resistor R10. After completion of the one-shot timing cycle, capacitor C4 begins to charge up again, but the voltage across C4 does not reach 1 volt until completion of the predetermined starting period (e.g., 200 milliseconds), as previously described. Accordingly, arc protection circuit 600 is effectively disabled during that period, thereby providing a successive timed starting period (e.g., 200 milliseconds) during which time inverter 200 is re-enabled in order to attempt to ignite and operate lamp 20.

After completion of the timed starting period, if no arcing is detected, arc protection circuit 600 allows inverter 200 to continue to operate in a normal manner. Conversely, if arcing is detected after completion of the timed starting period, arc protection circuit 600 will again disable inverter 200 for the predetermined shutdown period, as previously described. After each shutdown period, arc protection circuit 600 allows inverter 200 to restart and attempt to ignite the lamp for the timed starting period (e.g., 200 milliseconds) before responding to any disturbance. In this way, arc protection circuit 600 provides automatic restart capability, as well as a potentially useful visual indication (by flashing of lamp 70, if lamp 70 is indeed capable of igniting at all) of a need for servicing of the fixture and/or lamp(s).

Figure 5:
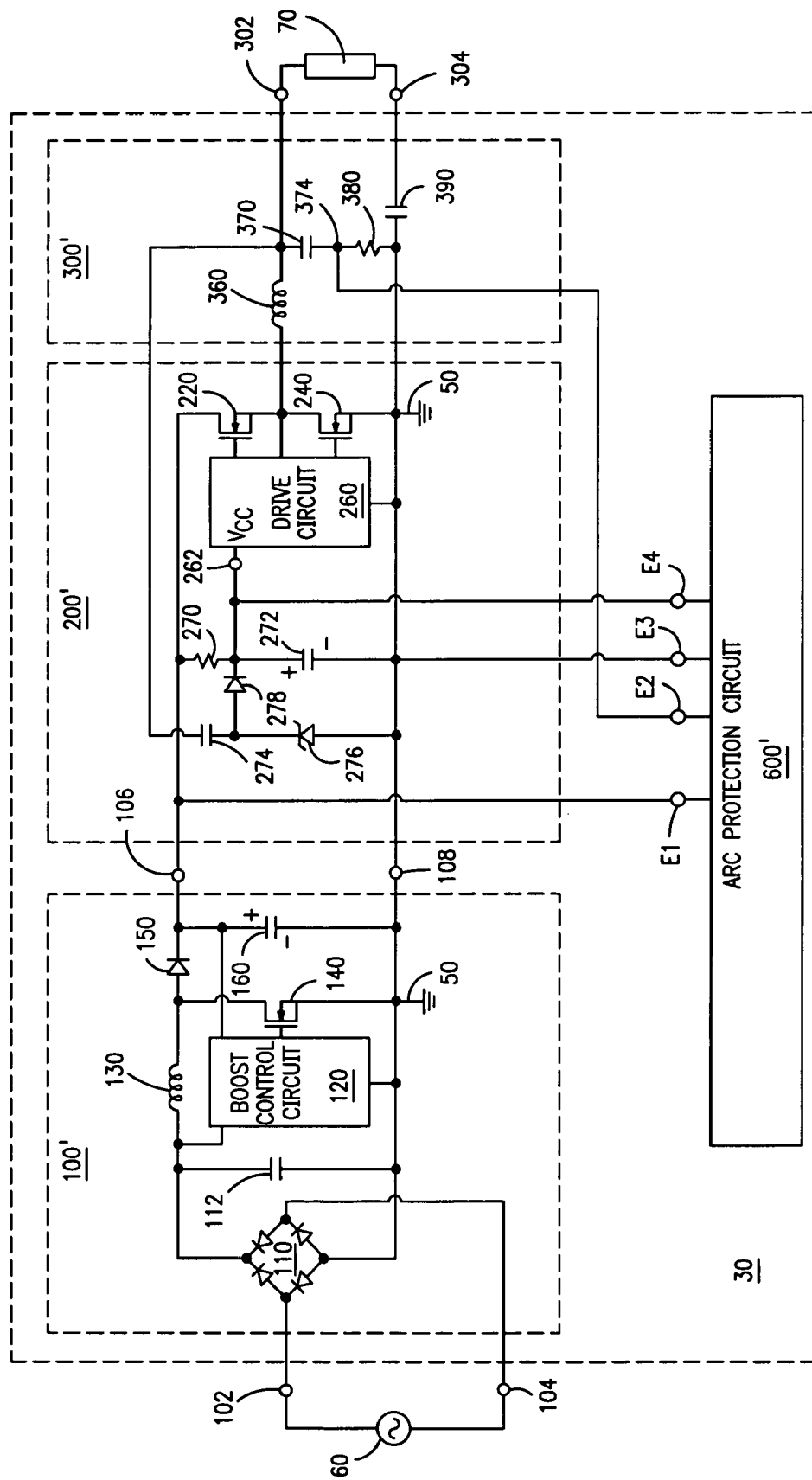
FIG. 5 is a partial block diagram schematic of a ballast with an arc protection circuit and a driven type inverter, in accordance with a second preferred embodiment of the present invention.

Turning now to FIG. 5, in a second preferred embodiment of the present invention, ballast 30 comprises an AC-to-DC converter 100', an inverter 200', an output circuit 300', and an arc protection circuit 600'. AC-to-DC converter 100' is implemented as a combination of a full-wave bridge rectifier 110 and a boost converter 120,130,140,150,160, inverter 200' is implemented as a driven half-bridge type inverter, and output circuit 300' is implemented as a series resonant output circuit. Because the structure and operation of AC-to-DC converter 100', inverter 200', and output circuit 300' are well known to those skilled in the ballast art, a detailed description of the operation of those circuit is not presented herein.

As described in FIG. 5, AC-to-DC converter 100' comprises input terminals 102,104, a full-wave diode bridge 110, a high frequency bypass capacitor 112, a boost control circuit 120, a boost inductor 130, a boost transistor 140, a boost rectifier 150, a bulk capacitor 160, and output terminals 106,108. During operation, AC-to-DC converter 100' receives (via input terminals 102,104) an AC supply voltage 60 and provides a DC rail voltage (via output terminals 106,108) to inverter 200'.

Inverter 200' comprises first and second inverter transistors 220,240, a drive circuit 260 coupled to first and second inverter transistors 220, 240, an inverter startup circuit 270,272, and an inverter bootstrapping circuit 274,276. Drive circuit 260 includes a DC operating voltage input 262 that receives operating power for drive circuit 260. Inverter startup circuit 270,272 comprises a startup resistor 270 and a startup capacitor 272; inverter startup circuit 270,272 provides power (via DC operating voltage input 262) for initially starting drive circuit 260. Inverter bootstrapping circuit 270,272 comprises a capacitor 274, a zener diode 276, and a diode 278, and provides power (via DC operating voltage input 262) for operating drive circuit 260 after inverter startup. During operation, inverter 200' receives the DC rail voltage from AC-to-DC converter 100' and provides (via complementary switching of inverter transistors 220, 240) a high frequency (e.g., greater than 20,000 hertz) alternating voltage to output circuit 300'.

Output circuit 300' comprises output connections 302, 304, a resonant inductor 360, a resonant capacitor 370, a resistor 380, and DC blocking capacitor 390. Resonant inductor 360 is coupled between inverter 200' and first output connection 302. Resonant capacitor 370 is coupled between first output connection 302 and a first node 374. Resistor 380 is coupled between first node 374 and circuit ground 50. DC blocking capacitor 390 is coupled between second output connection 304 and circuit ground 50. During operation, output circuit 300' receives the high frequency alternating voltage provided by inverter 200' and supplies (via output connections 302,304) a high voltage for igniting, and a magnitude-limited current for operating, lamp 70.

Figure 6:
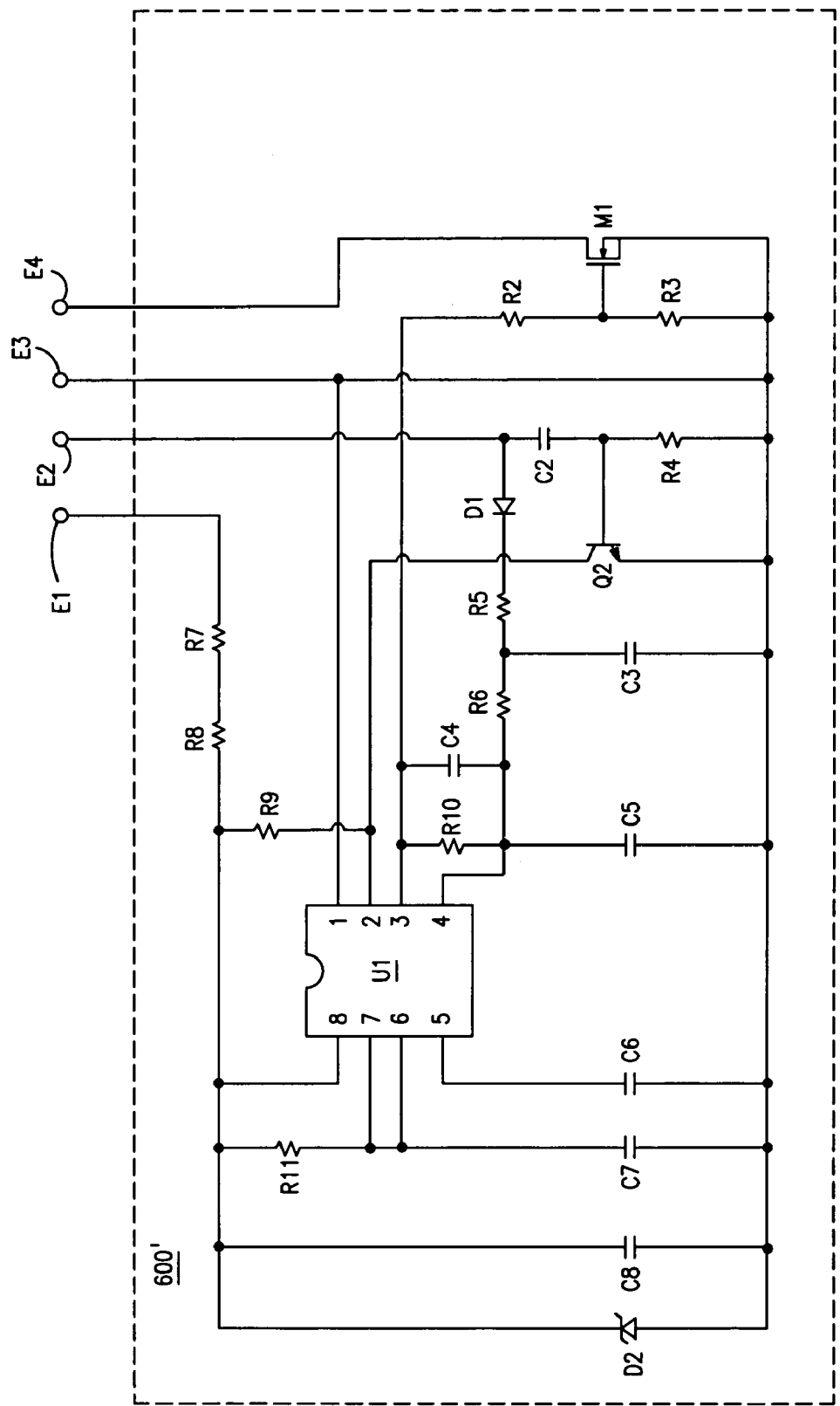
FIG. 6 is a detailed schematic diagram of an arc protection circuit that is suitable for use in the ballasts of FIG. 5 and FIG. 7, in accordance with the second and third preferred embodiments of the present invention.

As described in FIG. 6, arc protection circuit 600' comprises a DC supply input E1, a signal monitoring input E2, a circuit ground input E3, and an inverter disable output E4. DC supply input E1 is coupled to output connection 106 of AC-to-DC converter. Signal monitoring input E2 is coupled to first node 374 (i.e., at the junction of resonant capacitor 370 and resistor 380 within output circuit 300'). Circuit ground input E3 is coupled to circuit ground 50. Inverter disable output E4 is coupled to the DC supply input 262 of drive circuit 260. Significantly, in comparison with arc protection circuit 600 (previously described with reference to FIG. 3), arc protection circuit 600' does not require a startup inhibit output (E5 in FIG. 3) or its associated circuitry (R1,Q1 in FIG. 3); because inverter 200' is a driven type inverter, inverter disable output E4 (and associated circuitry within arc protection circuit 600') serves the dual functions of disabling inverter 200' and preventing inverter startup during the timed shutdown period.

In the second preferred embodiment, as described in FIG. 5, the voltage across resistor 380 serves as the electrical signal that is monitored by arc protection circuit 600. Because resistor 380 is electrically coupled to output connection 302,304, any disturbance (e.g., an arcing condition) that occurs at output connections 302,304 will induce transients in the voltage across resistor 380. Those transients will be detected by arc protection circuit via signal monitoring input E2.

During the timed starting period (e.g., the first 200 milliseconds after inverter 200' begins to operate), inverter 200' will be enabled and allowed to attempt to start lamp 70, regardless of the nature of the voltage across resistor 380. After completion of the timed starting period, if a disturbance (i.e., a fast rising transient) is detected in the voltage across resistor 380, arc protection circuit 600' will respond by shunting inverter disable output E4 to circuit ground 50 for the duration of the timed shutdown period (e.g., 2 seconds). With inverter disable output E4 shunted to ground, the DC operating voltage input of drive circuit 260 is likewise shunted to ground, causing a cessation of inverter switching and thereby disabling inverter 200'. At the same time, with inverter operating voltage input 262 coupled to ground via E4, startup capacitor 272 is prevented from charging up, thereby keeping drive circuit 260 off.

Upon completion of the timed shutdown period (e.g., after the inverter has been disabled for 2 seconds), arc protection circuit 600' ceases to shunt inverter disable output E4 to circuit ground 50, thereby re-enabling inverter 200' for the duration of the timed starting period. After completion of the timed starting period, if no arcing is detected, arc protection circuit 600' allows inverter 200' to continue to operate in a normal manner. Conversely, if arcing is detected after completion of the timed starting period, arc protection circuit 600' will again disable inverter 200' for the duration of the timed shutdown period (e.g., 2 seconds).

Referring now to FIG. 6, in a second preferred embodiment of the present invention, arc protection circuit 600' further comprises a timer integrated circuit U1, a detector circuit C2,R4,Q2, and a shunting circuit M1,R2,R3. Timer integrated circuit U1 is preferably realized by a 555 type timer integrated circuit, and includes a plurality of pins 1,2,3,4,5,6,7,8. Detector circuit C2,R4,Q2 is coupled to signal monitoring input E2, a second pin 2 of timer integrated circuit U1, and circuit ground 50. Shunting circuit M1,R2,R3 is coupled to inverter disable output E4, a third pin 3 of timer integrated circuit U1, and circuit ground 50.

The detailed operation of ballast 30 and arc protection circuit 600' is substantially similar to that which was previously described with reference to FIGS. 3 and 4. However, it should be appreciated that a significant difference between arc protection 600' and arc protection circuit 600 is that the former does not require a second shunting circuit for preventing inverter startup during the timed shutdown period; in arc protection circuit 600', because inverter 200' is a driven type inverter, shunting circuit M1,R2,R3 acts not only to disable inverter 200' but also to keep inverter 200' from attempting to restart during the timed shutdown period. It should be further noted that, in contrast with arc protection circuit 600 (FIG. 3), arc protection circuit 600' does not require a capacitor (C1 in FIG. 3) in series with transistor M1. Because inverter 200' is a driven type inverter, it is not necessary that inverter disable output E4 be shunted to a negative voltage level (e.g., −1 volt) in order to safely ensure inverter shutdown; rather, it is sufficient that inverter disable output E4 only be shunted to a level (e.g., less than a few volts) that is low enough to effect turn-off of inverter drive circuit 260.

Figure 7:
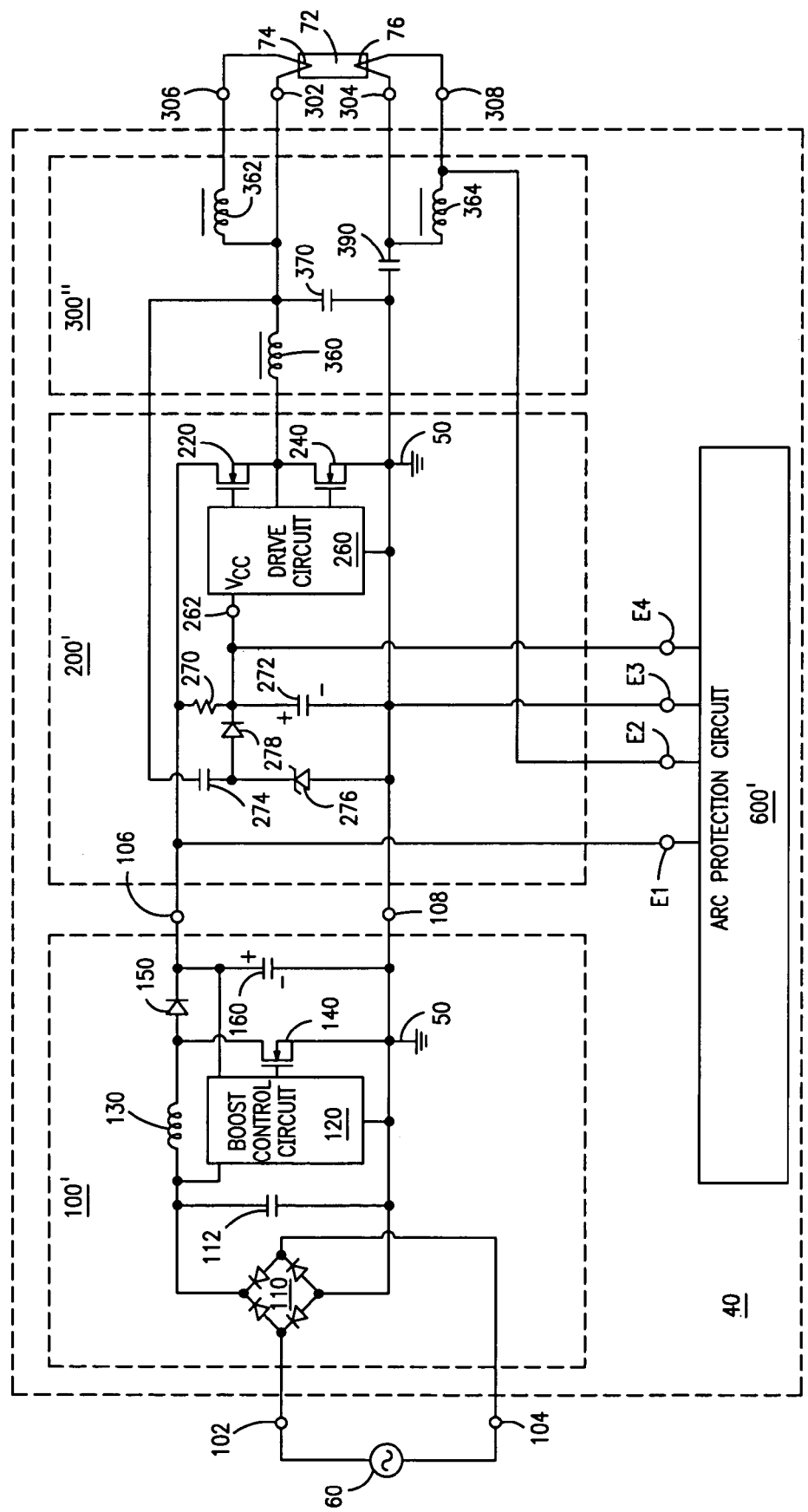
FIG. 7 is a partial block diagram schematic of a ballast with an arc protection circuit and a driven type inverter, wherein the ballast provides heating of the lamp filaments, in accordance with a third preferred embodiment of the present invention.

Turning now to FIG. 7, in a third preferred embodiment of the present invention, ballast 40 comprises an AC-to-DC converter 100', an inverter 200', an output circuit 300", and an arc protection circuit 600'. AC-to-DC converter 100', inverter 200', and arc protection circuit 600' are preferably implemented as previously described with reference to FIGS. 5 and 6. Like output circuit 300' (FIG. 5), output circuit 300" is a series resonant output circuit. However, unlike output circuit 300', output circuit 300" includes additional structure for providing preheating of lamp filaments 74,76. More specifically, output circuit 300" comprises first, second, third, and fourth output connections 302,304,306,308, a resonant inductor 360, a resonant capacitor, a first filament heating winding 362, a second filament heating winding 363, and a DC blocking capacitor 390. Preferably, first and second filament heating windings 362,364 are magnetically coupled to resonant inductor 360, and may be realized using the same magnetic assembly (i.e., bobbin and cores) as resonant inductor 360. Resonant inductor 360 is coupled between inverter 200' and circuit ground 50. Resonant capacitor 370 is coupled between first output connection 302 and circuit ground 50. First filament heating winding 362 is coupled between first output connection 302 and third output connection 306. Second filament heating winding 364 is coupled between second output connection 304 and fourth output connection 308. Finally, DC blocking capacitor 390 is coupled between second output connection 304 and circuit ground 50. During operation, output circuit 300" receives the high frequency alternating voltage provided by inverter 200'; output circuit 300" provides (via output connections 302,304,306,308) a voltage for preheating lamp filaments 74,76, as well as a high voltage for igniting, and a magnitude-limited current for operating, lamp 70. Because the structure and operation of output circuit 300" is well known to those skilled in the ballast art, a detailed description of the operation of that circuit is not presented herein.

In the third preferred embodiment, as described in FIG. 7, the voltage across second filament heating winding 364 serves as the electrical signal that is monitored by arc protection circuit 600. Because second filament heating winding 364 is electrically coupled to second and fourth output connection 304,308, any disturbance (e.g., an arcing condition) that occurs at output connections 302,304,306, 308 will induce transients in the voltage across second filament heating winding 364. Those transients will be detected by arc protection circuit via signal monitoring input E2.

During the timed starting period (e.g., the first 200 milliseconds after inverter 200' begins to operate), inverter 200' will be enabled and allowed to attempt to start lamp 70, regardless of the nature of the voltage across winding 364. After completion of the timed starting period, if a disturbance (i.e., a fast rising transient) is detected in the voltage across winding 364, arc protection circuit 600' responds by effectively shunting inverter disable output E4 to circuit ground 50 for the duration of the timed shutdown period (e.g., 2 seconds). With inverter disable output E4 effectively shunted to ground, the DC operating voltage input of drive circuit 260 is likewise effectively shunted to ground, causing a cessation of inverter switching and thereby disabling inverter 200'. At the same time, with inverter operating voltage input 262 effectively coupled to ground via E4, startup capacitor 272 is prevented from charging up; thereby keeping drive circuit 260 off.

Upon completion of the timed shutdown period (e.g., after the inverter has been disabled for 2 seconds), arc protection circuit 600' ceases to effectively shunt inverter disable output E4 to circuit ground 50, thereby re-enabling inverter 200' for the duration of the timed starting period. After completion of the timed starting period, as long as no arcing is detected, arc protection circuit 600' allows inverter 200' to continue to operate in a normal manner. Conversely, if arcing is detected at any time after completion of the timed starting period, arc protection circuit 600' will again disable inverter 200' for the duration of the timed shutdown period (e.g., 2 seconds).

The detailed operation of ballast 40 and arc protection circuit 600' is substantially similar to that which was previously described with reference to FIGS. 5 and 6 herein.

Although the present invention has been described with reference to certain preferred embodiments, numerous modifications and variations can be made by those skilled in the art without departing from the novel spirit and scope of this invention.

What is claimed is:

1. A ballast for powering at least one gas discharge lamp, the ballast comprising:
   an inverter;
   an output circuit coupled to the inverter, the output circuit comprising output connections adapted for coupling to a lamp load comprising at least one gas discharge lamp;
   an arc protection circuit coupled to the inverter, wherein the arc protection circuit is operable:
   (a) to monitor an electrical signal within at least one of the inverter and the output circuit, wherein a disturbance in the electrical signal is deemed to have occurred when at least a portion of the electrical signal exhibits a time-rate-of-change that exceeds a predetermined threshold value;
   (b) to provide a timed starting period wherein the inverter is enabled and allowed to attempt to start the lamp independent of any disturbance in the electrical signal;
   (c) in response to occurrence of a disturbance in the electrical signal after completion of the timed starting period:
      (i) to disable the inverter and to keep the inverter disabled for a timed shutdown period; and
      (ii) after completion of the timed shutdown period, to again provide the timed starting period wherein the inverter is enabled and allowed to attempt to start the lamp independent of any disturbance in the electrical signal.

2. The ballast of claim 1, wherein the arc protection circuit is operable, after completion of the timed starting period, to disable the inverter in response to at least one of:
   an arcing condition at an output of the ballast; and
   disconnection of a lamp from the ballast.

3. The ballast of claim 1, wherein:
   during normal operation of the ballast and gas discharge lamp load, the electrical signal is a periodic signal having a period; and
   the arc protection circuit is operable, after completion of the timed starting period, to disable the inverter within a response time that is less than twice the period of the electrical signal.

4. The ballast of claim 1, wherein the arc protection circuit is operable, after completion of the timed starting period, to disable the inverter within less than about 100 microseconds after occurrence of the disturbance.

5. The ballast of claim 1, wherein:
   the timed starting period is on the order of about 200 milliseconds; and
   the timed shutdown period is on the order of about 2 seconds.

6. The ballast of claim 1, wherein the timed shutdown period is at least about ten times greater than the timed starting period.

7. The ballast of claim 1, wherein:
the ballast further comprises an AC-to-DC converter, having an input for receiving an AC supply voltage and an output for providing a DC rail voltage to the inverter;
the inverter is a self-oscillating type inverter, comprising:
first and second inverter transistors;
a first base drive circuit coupled to the first inverter transistor;
a second base drive circuit coupled to the second inverter transistor;
a circuit ground; and
an inverter startup circuit coupled to the AC-to-DC converter, the second inverter transistor, and circuit ground;
the arc protection circuit comprises:
a DC supply input coupled to the output of the AC-to-DC converter;
a signal monitoring input coupled to the second base drive circuit;
a circuit ground input coupled to circuit ground;
an inverter disable output coupled to the second inverter transistor;
an inverter startup inhibit output coupled to the inverter startup circuit; and
the arc protection circuit is further operable such that:
the electrical signal that is monitored by the arc protection circuit comprises an electrical signal within the second base drive circuit that is monitored via the signal monitoring input;
during the timed starting period, the inverter is enabled and allowed to attempt to start the lamp, regardless of the nature of the electrical signal at the signal monitoring input;
in response to occurrence of a disturbance in the electrical signal after completion of the timed starting period, the inverter is disabled by effectively shunting the inverter disable output and the inverter startup inhibit output to circuit ground for the duration of the timed shutdown period;
upon completion of the timed shutdown period, the inverter is re-enabled for the timed starting period by ceasing to effectively shunt the inverter disable output and the inverter startup inhibit output to circuit ground for the duration of the timed starting period.

8. The ballast of claim 7, wherein the protection circuit further comprises:
a timer integrated circuit comprising a plurality of pins;
a detector circuit (C2, R4, Q2) coupled to the signal monitoring input (E2), a second pin (2) of the timer integrated circuit (U1), and circuit ground (50);
a first shunting circuit (C1, M1, R2, R3) coupled to the inverter disable output (E4), a third pin (3) of the timer integrated circuit (U1), and circuit ground (50); and
a second shunting circuit (Q1, R1) coupled to the inverter startup inhibit output (E5), the third pin (3) of the timer integrated circuit (U1), and circuit ground (50).

9. The ballast of claim 8, wherein the timer integrated circuit is a 555 type timer integrated circuit.

10. The ballast of claim 8, wherein:
the output circuit includes an output transformer, comprising:
a primary winding coupled to the inverter;
a secondary winding coupled to the output connections;
a first auxiliary winding that is part of the first base drive circuit; and
a second auxiliary winding that is part of the second base drive circuit; and
the signal monitoring input of the arc protection circuit is coupled to the second auxiliary winding of the output transformer.

11. The ballast of claim 1, wherein:
the ballast further comprises an AC-to-DC converter having an input for receiving an AC supply voltage and an output for providing a DC rail voltage to the inverter;
the inverter is a driven type inverter comprising:
first and second inverter transistors;
an inverter drive circuit coupled to the first and second inverter transistors, the inverter drive circuit having a DC operating voltage input;
a circuit ground;
an inverter startup circuit coupled to the output of the AC-to-DC converter and the DC operating voltage input of the inverter drive circuit; and
the arc protection circuit comprises:
a DC supply input coupled to the output of the AC-to-DC converter;
a signal monitoring input coupled to the output circuit;
a circuit ground input coupled to circuit ground; and
an inverter disable output coupled to the DC operating voltage input of the inverter drive circuit; and
the arc protection circuit is further operable such that:
the electrical signal that is monitored by the arc protection circuit comprises an electrical signal within the output circuit that is monitored via the signal monitoring input;
during the timed starting period, the inverter is enabled and allowed to attempt to start the lamp, regardless of the nature of the electrical signal at the signal monitoring input;
after completion of the timed starting period, in response to occurrence of a disturbance in the electrical signal after completion of the timed starting period, the inverter is disabled by effectively shunting the inverter disable output to circuit ground for the duration of the timed shutdown period;
upon completion of the timed shutdown period, the inverter is re-enabled for the timed starting period by ceasing to effectively shunt the inverter disable output to circuit ground for the duration of the timed starting period.

12. The ballast of claim 11, wherein the arc protection circuit further comprises:
a timer integrated circuit comprising a plurality of pins;
a detector circuit coupled to the signal monitoring input, a second pin of the timer integrated circuit, and circuit ground; and
a shunting circuit coupled between the inverter disable output and circuit ground.

13. The ballast of claim 12, wherein the timer integrated circuit is a 555 type timer integrated circuit.

14. The ballast of claim 11, wherein:
the output circuit comprises:
a resonant inductor coupled between the inverter and a first output connection;
a resonant capacitor coupled between the first output connection and a first node;
a resistor coupled between the first node and circuit ground; and
a DC blocking capacitor coupled between a second output connection and circuit ground; and the signal monitoring input of the arc protection circuit is coupled to the first node.

15. The ballast of claim 11, wherein:
the output circuit comprises:
   a resonant inductor coupled between the inverter and a first output connection;
   a resonant capacitor coupled between the first output connection and circuit ground;
   a DC blocking capacitor coupled between a second output connection and circuit ground;
   a first filament heating winding coupled between the first output connection and a third output connection; and
   a second filament heating winding coupled between the second output connection and a fourth output connection; and
the signal monitoring input of the arc protection circuit is coupled to the fourth output connection.

16. A ballast for powering at least one gas discharge lamp, the ballast comprising:
an AC-to-DC converter having an input for receiving an AC supply voltage and an output for providing a DC rail voltage;
a self-oscillating type inverter coupled to the output of the AC-to-DC converter, the inverter comprising:
   first and second inverter transistors;
   a first base drive circuit coupled to the first inverter transistor;
   a second base drive circuit coupled to the second inverter transistor;
   a circuit ground; and
   an inverter startup circuit coupled to the AC-to-DC converter, the second inverter transistor, and circuit ground;
an output circuit coupled to the inverter, the output circuit comprising output connections adapted for coupling to a lamp load comprising at least one gas discharge lamp;
an arc protection circuit coupled to the inverter, the arc protection circuit comprising:
   a DC supply input coupled to the output of the AC-to-DC converter;
   a signal monitoring input coupled to the second base drive circuit;
   a circuit ground input coupled to circuit ground;
   an inverter disable output coupled to the second inverter transistor;
   an inverter startup inhibit output coupled to the inverter startup circuit; and
wherein:
   the arc protection circuit is operable to monitor an electrical signal within the inverter, wherein a disturbance in the electrical signal is deemed to have occurred when at least a portion of the electrical signal exhibits a time-rate-of-change that exceeds a predetermined threshold value;
   the arc protection circuit monitors, via the signal monitoring input, an electrical signal within the second base drive circuit;
   during a timed starting period, the inverter is enabled and allowed to attempt to start the lamp, regardless of any disturbance in the electrical signal at the signal monitoring input;
   in response to occurrence of a disturbance in the electrical signal after completion of the timed starting period, the inverter is disabled by effectively shunting the inverter disable output and the inverter startup inhibit output to circuit ground for a timed shutdown period; and
   upon completion of the timed shutdown period, the inverter is re-enabled by ceasing to effectively shunt the inverter disable output and the inverter startup inhibit output to circuit ground for the duration of the timed starting period.

17. The ballast of claim 16, wherein the protection circuit further comprises:
   a timer integrated circuit comprising a plurality of pins;
   a detector circuit coupled to the signal monitoring input, a second pin of the timer integrated circuit, and circuit ground;
   a first shunting circuit coupled to the inverter disable output, a third pin of the timer integrated circuit, and circuit ground; and
   a second shunting circuit coupled to the inverter startup inhibit output, the third pin of the timer integrated circuit, and circuit ground.

18. The ballast of claim 17, wherein the timer integrated circuit is a 555 type timer integrated circuit.

19. The ballast of claim 17, wherein:
the output circuit includes an output transformer, comprising:
   a primary winding coupled to the inverter;
   a secondary winding coupled to the output connections;
   a first auxiliary winding that is part of the first base drive circuit and that is coupled to the first inverter transistor; and
   a second auxiliary winding that is part of the second base drive circuit and that is coupled to the second inverter transistor; and
the signal monitoring input of the arc protection circuit is coupled to the second auxiliary winding of the output transformer.

20. A ballast for powering at least one gas discharge lamp, the ballast comprising:
an AC-to-DC converter having an input for receiving an AC supply voltage and an output for providing a DC rail voltage;
a driven type inverter coupled to the output of the AC-to-DC converter, the inverter comprising:
   first and second inverter transistors;
   an inverter drive circuit coupled to the first and second inverter transistors, the inverter drive circuit having a DC operating voltage input;
   an inverter startup circuit coupled between the output of the AC-to-DC converter and the DC operating voltage input of the inverter drive circuit; and
   a circuit ground;
an output circuit coupled to the inverter, the output circuit comprising output connections adapted for coupling to a lamp load comprising at least one gas discharge lamp;
an arc protection circuit coupled to the inverter and the output circuit, wherein the arc protection circuit comprises:
   a DC supply input coupled to the output of the AC-to-DC converter;
   a signal monitoring input coupled to the output circuit;
   a circuit ground input coupled to circuit ground; and
   an inverter disable output coupled to the DC operating voltage input of the inverter drive circuit; and
wherein:
   the arc protection circuit is operable to monitor, via the signal monitoring input, an electrical signal within the output circuit, wherein a disturbance in the electrical signal is deemed to have occurred when at least a portion of the electrical signal exhibits a time-rate-of-change that exceeds a predetermined threshold value;

during a timed starting period, the inverter is enabled and allowed to attempt to start the lamp, regardless of any disturbance in the electrical signal at the signal monitoring input;

in response to occurrence of a disturbance in the electrical signal after completion of the timed starting period, the inverter is disabled by effectively shunting the inverter disable output to circuit ground for a timed shutdown period; and upon completion of the timed shutdown period, the inverter is re-enabled by ceasing to shunt the inverter disable output to circuit ground for the duration of the timed starting period.

21. The ballast of claim 20, wherein the arc protection circuit further comprises:

a timer integrated circuit comprising a plurality of pins;

a detector circuit coupled to the signal monitoring input, a second pin of the timer integrated circuit, and circuit ground; and a shunting circuit coupled to the inverter disable output, a third pin of the timer integrated circuit, and circuit ground.

22. The ballast of claim 21, wherein the timer integrated circuit is a 555 type timer integrated circuit.

23. The ballast of claim 21, wherein:

the output circuit comprises:

a resonant inductor coupled between the inverter and a first output connection;

a resonant capacitor coupled between the first output connection and a first node;

a resistor coupled between the first node and circuit ground; and a DC blocking capacitor coupled between a second output connection and circuit ground; and the signal monitoring input of the arc protection circuit is coupled to the first node.

24. The ballast of claim 21, wherein:

the output circuit comprises:

a resonant inductor coupled between the inverter and a first output connection;

a resonant capacitor coupled between the first output connection and circuit ground;

a DC blocking capacitor coupled between a second output connection and circuit ground;

a first filament heating winding coupled between the first output connection and a third output connection; and a second filament heating winding coupled between the second output connection and a fourth output connection; and the signal monitoring input of the arc protection circuit is coupled to the fourth output connection.

* * * * *